US009370031B2

(12) United States Patent
Birlik et al.

(10) Patent No.: US 9,370,031 B2
(45) Date of Patent: *Jun. 14, 2016

(54) WIRELESS NETWORK SETUP AND CONFIGURATION DISTRIBUTION SYSTEM

(71) Applicant: AIRTIES KABLOSUZ ILETISIM SAN. VE DIS TIC. A.S., Istanbul (TR)

(72) Inventors: Firat Birlik, Istanbul (TR); Gursel Mutlu, Mountain View, CA (US)

(73) Assignee: Airties Kabloϵuz Iletisim San. Ve Dis Tic. A.S., Istanbul (TR)

( * ) Notice: Subject to any disclaimer, the term of this patent is extended or adjusted under 35 U.S.C. 154(b) by 0 days.

This patent is subject to a terminal disclaimer.

(21) Appl. No.: 14/680,510

(22) Filed: Apr. 7, 2015

(65) Prior Publication Data
US 2015/0215976 A1    Jul. 30, 2015

Related U.S. Application Data

(63) Continuation of application No. 13/460,139, filed on Apr. 30, 2012, now Pat. No. 9,007,957.

(30) Foreign Application Priority Data

Apr. 29, 2011 (EP) .................... 11164227

(51) Int. Cl.
 H04W 4/00 (2009.01)
 H04W 76/02 (2009.01)
 H04L 12/24 (2006.01)
 H04W 12/08 (2009.01)
 H04W 12/06 (2009.01)
(52) U.S. Cl.
 CPC .......... *H04W 76/02* (2013.01); *H04L 41/0813* (2013.01); *H04W 4/00* (2013.01); *H04W 4/001* (2013.01); *H04W 12/08* (2013.01); *H04W 12/06* (2013.01)

(58) Field of Classification Search
None
See application file for complete search history.

(56) References Cited

U.S. PATENT DOCUMENTS

| 7,916,663 | B2 | 3/2011 | Yee |
| 7,974,236 | B2 | 7/2011 | Woo |
| 7,986,642 | B2 | 7/2011 | Ishimoto |
| 8,411,604 | B2 | 4/2013 | Reif |
| 8,474,020 | B2 | 6/2013 | Hamachi |
| 8,488,493 | B2 | 7/2013 | Won |
| 8,547,873 | B2 | 10/2013 | Yee |
| 8,649,297 | B2 | 2/2014 | Ahlers et al. |
| 2003/0087629 | A1 | 5/2003 | Juitt et al. |
| 2006/0285514 | A1 | 12/2006 | Hoerl et al. |
| 2007/0143391 | A1 | 6/2007 | Nakamura |
| 2009/0129347 | A1 | 5/2009 | Woo |
| 2009/0228707 | A1 | 9/2009 | Linsky |

(Continued)

OTHER PUBLICATIONS

Communication and Search Report for corresponding European patent application No. 11164227.8 dated Jul. 3, 2013.

(Continued)

*Primary Examiner* — Michael J Moore, Jr.
(74) *Attorney, Agent, or Firm* — Harness, Dickey & Pierce

(57) ABSTRACT

The present invention relates to a wireless network that operates in accordance with the IEEE 802.11n standards and comprises at least one router (2) by which the connections established with the other devices are routed via a wireless network (1), at least one access point (3) which serves as a data transmission point in the network, and at least one client device (4) that uses the network sources; and to a wireless network setup and configuration distribution method (100) which enables to easily configure the devices that connect to the said networks.

19 Claims, 5 Drawing Sheets

(56) References Cited

U.S. PATENT DOCUMENTS

| | | |
|---|---|---|
| 2010/0299730 A1 | 11/2010 | Hamachi |
| 2011/0055409 A1 | 3/2011 | Tsai |
| 2011/0230139 A1 | 9/2011 | Nakahara |
| 2012/0122501 A1 | 5/2012 | Lai |
| 2012/0317247 A1 | 12/2012 | Dattagupta et al. |
| 2012/0320401 A1 | 12/2012 | Shibata |
| 2013/0058274 A1 | 3/2013 | Scherzer et al. |
| 2013/0194944 A1 | 8/2013 | Soyak et al. |
| 2013/0242862 A1 | 9/2013 | Birlik |

OTHER PUBLICATIONS

Decision to Grant a European Patent for corresponding European patent application No. 11164227.8 dated Feb. 6, 2014.

Kari Kostiainen et al., "Usable Access Control Inside Home Networks," World of Wireless, Mobile and Multimedia Networks, 2007. WOWMOM 2007. IEEE International Symposium on A, IEEE, PI, Jun. 1, 2007, pp. 1-6, XP031149243, ISBN: 978-1-4244-0992-1.

Cynthia Kuo et al., "Low-Cost Manufacturing, Usability, and Security: An Analysis of Bluetooth Simple Pairing and Wi-Fi Protected Setup," Feb. 12, 2007. Financial Cryptography and Data Security; [Lecture Notes in Computer Science], Springer Berlin Heidelberg, Berlin, Heidelberg, pp. 325-340, XP019137008, ISBN: 978-3-540-77365-8.

Grochla K et al., "Autoconfiguration procedures for multiradio wireless mesh networks based on DHCP protocol," World of Wireless, Mobile and Multimedia Networks & Workshops, 2009. WOWMOM 2009. IEEE International Symposium on a, IEEE, Piscataway, NJ, USA, Jun. 15, 2009, pp. 1-6, XP031543604, ISBN: 978-1-4244-4440-3.

WIRELESS NETWORK SETUP AND CONFIGURATION DISTRIBUTION SYSTEM

CROSS-REFERENCE TO RELATED APPLICATIONS

This is a continuation of, and claims priority under 35 U.S.C. §120 to, U.S. application Ser. No. 13/460,139, filed Apr. 30, 2012, and further claims priority under 35 U.S.C. §119 to European Application No. 11164227.8, filed Apr. 29, 2011.

FIELD OF THE INVENTION

The present invention relates to a wireless network that operates in accordance with the IEEE 802.11 n standards and a wireless network setup and configuration distribution system, which enables to easily configure devices that connect to the said networks and do not have a user screen.

BACKGROUND OF THE INVENTION

Wireless networks whose areas of use increasingly expand nowadays are basically comprised of a router (A) connected to external networks (A) (for example internet), access points between which mutual data transmission is provided via the router, and client devices which are connected to these points via wire or wirelessly. Day by day increase in the number and kinds of client devices brings along the difficulty of identifying these devices to the network.

The existing wireless network products can create a joint network only as a result of making many mutual configurations manually. Additionally, when a configuration related to the network changes in any device, that device remains out of the network. As long as the configuration related to the network does not match with all of the devices the device can not be included in the network. Creating a secure wireless network in which a plurality of devices are involved and subsequently making configuration changes require too much technical knowledge for an ordinary user. Wireless network connections of the mesh networks, which are used to expand the coverage area of wireless networks, other computers that connect to these networks wirelessly and various wireless multimedia devices should be secure, easy-to-setup and the configurations thereof should be easy-to-change.

In WPS (Wi-Fi Protected Setup) definition defined by Wi-Fi Alliance, a method is described that will connect the access point and the wireless device to each other easily and safely. In this definition, expansion of the coverage area by adding new access points between the secondary areas of use are disclosed, while technical details are not specified. This definition does not provide a direct statement for setup and configuration of mesh networks, however it provides an infrastructure suitable for developing specific applications.

In U.S. Patent Application Publication No. US2003087629A1, known in the state of the art, an additional gateway server is proposed as the control mechanism with the purpose of overcoming the flaws of WEP encryption having low level of security and administering a large-scale wireless network. However this application is not a network setup method that can be used by ordinary home users, but it is a wireless network administration application that requires complicated configurations and setups.

In U.S. Patent Application Publication No. US20060285514A1, known in the state of the art, it is proposed to incorporate wireless network feature to devices that are distant from each other such as computer, pocket computer, printer, server and to remote control them. It is provided that wireless network infrastructure should be already setup for this application to operate. However, setup of a mesh network structure that provides wide coverage is also an application that requires technical knowledge in practice.

SUMMARY OF THE INVENTION

The objective of the present invention is to develop a wireless network setup and configuration distribution system Which facilitates setup of devices that connect to IEEE802.11 wireless networks.

Another objective of the present invention is to develop a wireless network setup and configuration distribution system which automatically transfers the configuration changes in the network to the devices that connect to IEEE802.11 wireless networks.

BRIEF DESCRIPTION OF THE DRAWINGS

"Wireless network setup and configuration distribution method" developed to fulfill the objective of the present invention is illustrated in the accompanying figures, in which.

Figure 1:
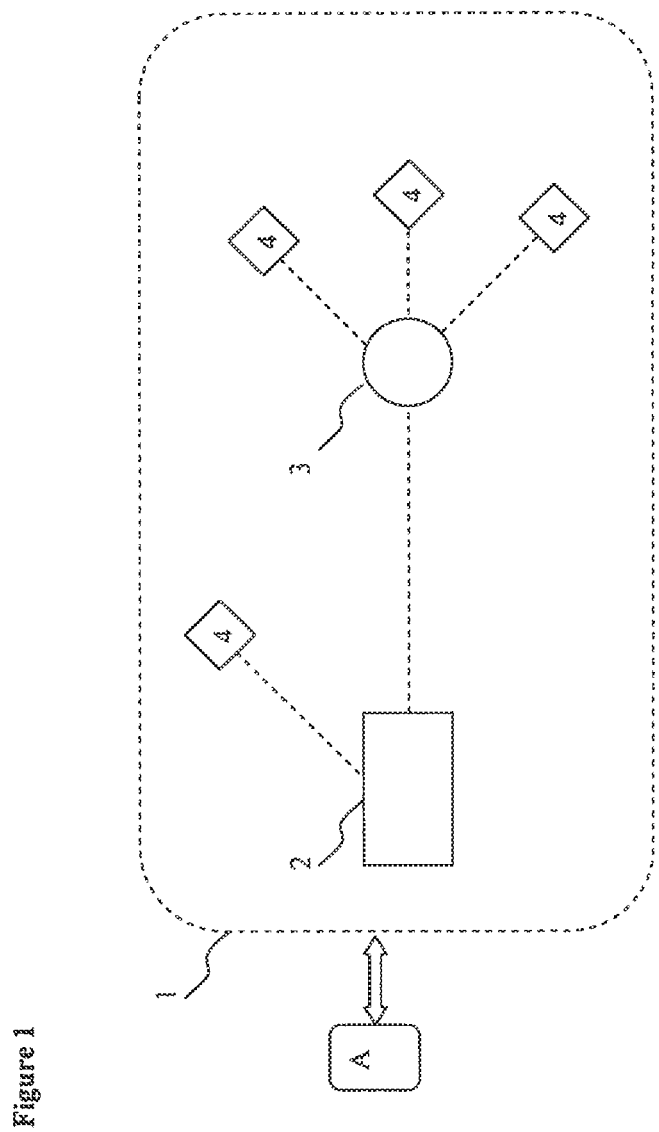
FIG. 1 is the schematic view of the inventive wireless network setup and configuration distribution system.

The parts seen in the figures are each given a reference numeral where the numerals refer to the following:

1. Wireless network setup and configuration distribution system
2. Router
3. Access point
4. Client device

DETAILED DESCRIPTION OF THE PREFERRED EMBODIMENTS

The inventive wireless network setup and configuration distribution system (1) comprises at least one router (2) which establishes connection with other networks (A) and routes the connections that it establishes. The wireless mesh network (1) additionally comprises at least one access point (3) which serves as a data transmission point in the network and/or at least one client device (4) that uses the network sources.

In the preferred embodiment of the invention, the inventive wireless network setup and configuration distribution system (1) comprises at least one router (2) which establishes connection with other networks (A) and routes the connections that it establishes, at least one access point (3) which serves as a data transmission point in the network and at least one client device (4) that uses the network sources (FIG. 1).

Figure 3:
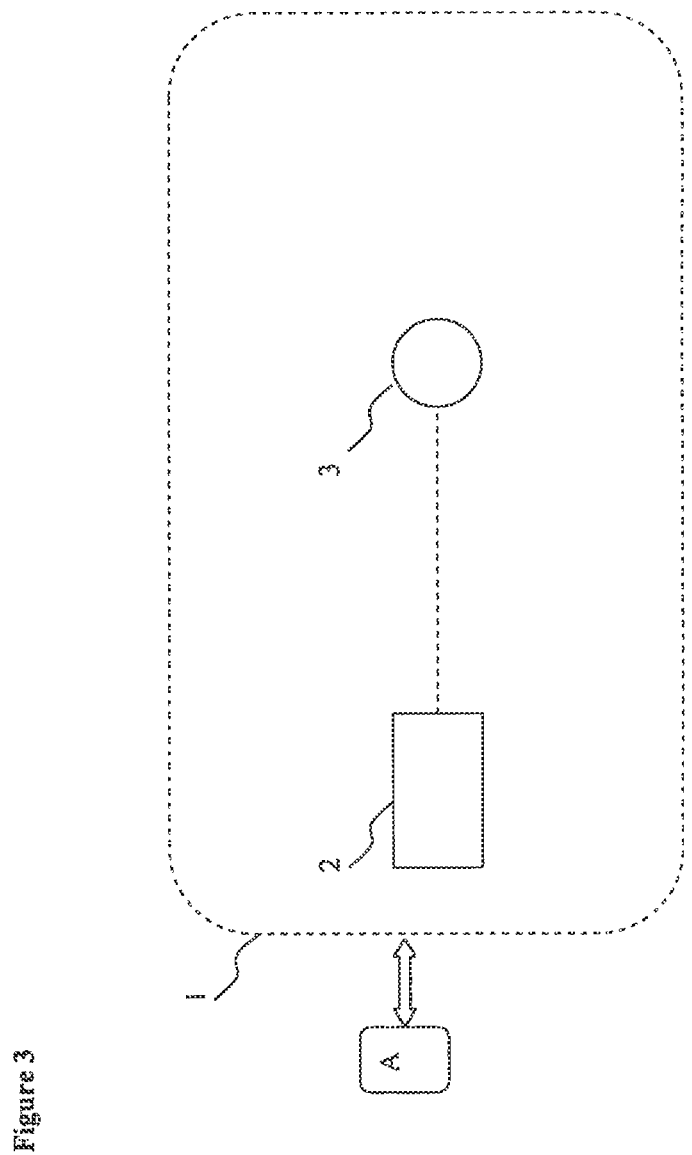
FIG. 3 is a schematic view of an embodiment of the inventive system.

In another embodiment of the invention, the inventive wireless network setup and configuration distribution system (1) comprises at least one router (2) which establishes connection with other networks (A) and routes the connections that it establishes, and at least one access point (3) which serves as a data transmission point in the network. (FIG. 3).

Figure 4:
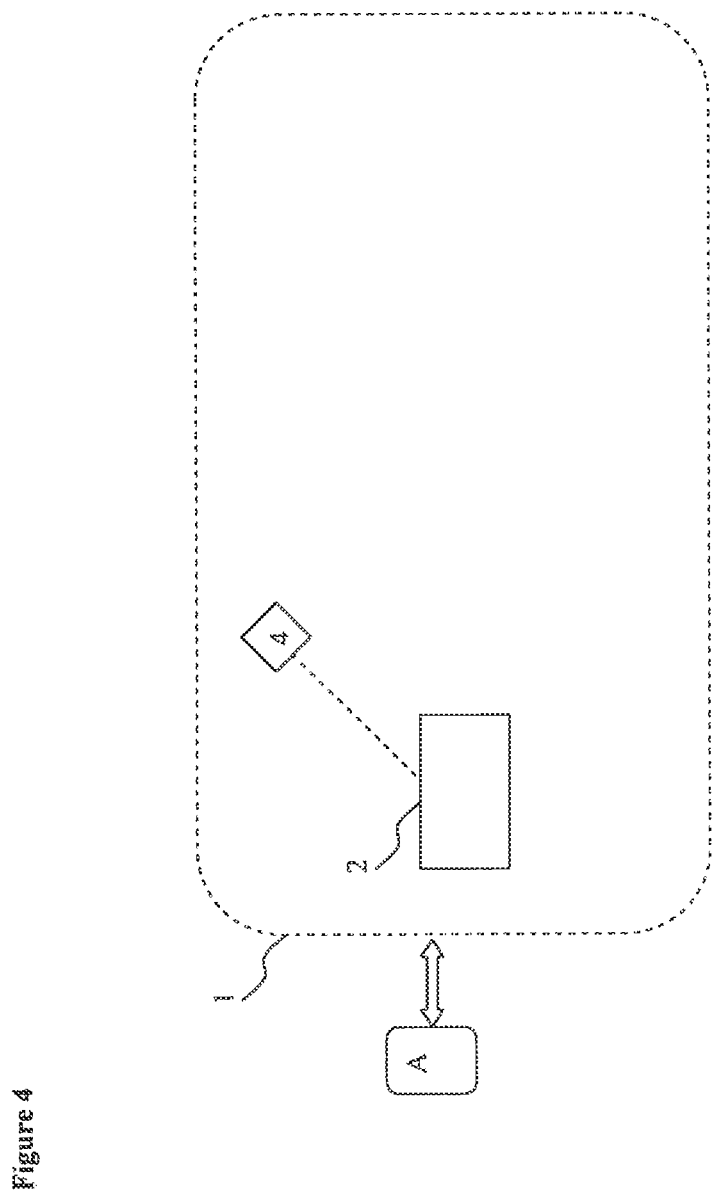
FIG. 4 is a schematic view of another embodiment of the inventive system.

In another embodiment of the invention, the inventive wireless network setup and configuration distribution system (1) comprises at least one router (2) which establishes connection with other networks (A) and routes the connections that it establishes, and at least one client device (4) that uses the network sources. (FIG. 4).

Communication of the access points (3) and client devices (4) in the wireless mesh network setup and configuration distribution system (1) with each other and with other networks (A) is provided by the router (2). The communication within the wireless network is enabled by the radio signals carrying the data packets. The data packets sent by the device (source device), which is the initial source of the data packets, reach the final device (target device) that the data packets are intended to reach via the router (2).

The router (2) determines the route of a data packet from one station to another. The router (2) communicates with the other devices (2, 3 and 4) for selection of the route by using routing protocol, and adds the incoming information to the routing table that is present in the router (2) as a standard. The routing table includes the routes towards known targets (2, 3 and 4). When necessary, addresses can also be added manually to the said table and/or addresses can be manually deleted from the table. Wireless mesh network is created by connecting access points (3) to the wireless network (1) in order to expand the coverage area of the wireless network setup and configuration distribution system (1). Access points (3) rebroadcast the data packets that they receive from any source device (2, 3 or 4). Thus, the signals that attenuate until they arrive at the access point (3) can be strengthened and transmitted to the target devices (2, 3 or 4).

While the client devices (4) can directly connect to the router (2) for access to the network sources, they can also connect via access points (3). Client devices (4) are devices which require access to the network sources while operating. These include, but are not limited to, devices such as computer, pocket computer, security camera, mobile phone.

The router (2) connected to the inventive wireless network setup and configuration distribution system (1) constantly broadcasts the configurations of the wireless network setup and configuration distribution system (1) by means of management packets. Management packets are data packets which preferably accommodate manufacturer code, Wireless network identification code, configuration change serial number information and which are generated and broadcasted by the device wherein configuration change is implemented. The manufacturer code is a serial number specific to the manufacturer. This serial number is preferably a SMI (Structure of Management Information) network management serial number recorded in LANA (Internet Assigned Numbers Authority). This code is a 24 bit value.

The wireless network identification code is preferably a 16 digit value, preferably in hexadecimal format, which is randomly selected during setup of the first device in the network. The configuration change serial number is the value which is preferably defined as 1 in the setup of the first device in the network and which is increased at a random value preferably between 1 and 1000 in the device wherein configuration change is implemented. The router (2) writes the manufacturer code, wireless network identification codes and configuration change serial number into this packet before broadcasting the management packet. Then it broadcasts the generated packet wirelessly.

The access point (3) that receives the management data broadcasted by the router (2) sorts out the manufacturer code, wireless network identification codes and configuration change serial number information written in the packet. Then, according to the state of this information, it decides whether there is a change in the configurations and if there is a configuration change, receives the new configurations from the device that broadcasts the configurations. The access point (3) rebroadcasts the management packet that it receives in order to convey it to the client devices (4).

The client device (4) that receives the management packet broadcasted by the router (2) or the access point (3) sorts out the manufacturer code, wireless network identification code and configuration change serial number information written in the packet. Then, according to the state of this information, it decides whether there is a change in the configurations and if there is a configuration change, receives the new configurations by means of a password called PIN.

Figure 2:
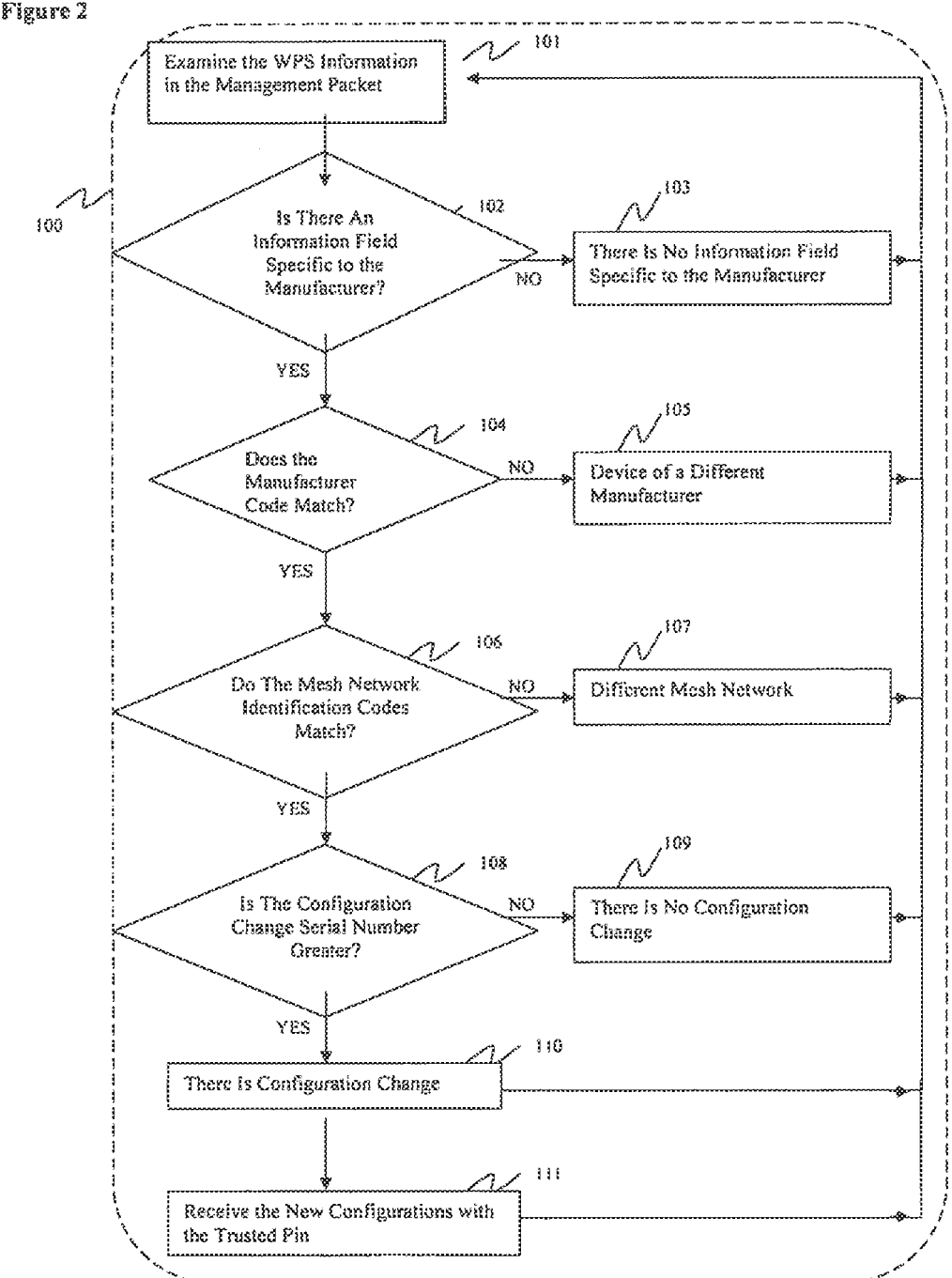
FIG. 2 is the flowchart of the method that operates the inventive system.

The configuration distribution method (100), which is used in the wireless network setup and configuration distribution system (1), and which enables the configuration changes in the network to be automatically transferred to the other devices, comprises the steps of:

Examining the WPS information in the management packet (101);

Controlling whether there is an information field specific to the manufacturer (102);

If there is no information field specific to the manufacturer, renewing the WPS information in the management packet in order for it to be examined (103);

If there is an information field specific to the manufacturer, controlling whether the manufacturer code matches with the manufacturer code of the device (2, 3 or 4) (1 04);

If the manufacturer code does not match with the manufacturer code of the device (2, 3 or 4), renewing the WPS information in the management packet in order for it to be examined (105);

If the manufacturer code matches, controlling whether the wireless network identification codes match with the wireless network identification code of the device (106);

If the wireless network identification codes do not match, renewing the WPS information in the management packet in order for it to be examined (107);

If the wireless network identification codes match, controlling the configuration change serial number (108);

If the configuration change serial number is smaller than the configuration number in the memory of the device (2, 3 or 4), renewing the WPS information in the management packet in order for it to be examined (109);

If the configuration change serial number is greater than the configuration number in the memory of the device (2, 3 or 4), determining that there is a configuration change (110), and Receiving the new configurations with the trusted PIN (111). (FIG. 2).

In case of any configuration change related to the wireless network setup and configuration distribution system (1), this configuration(s) should be transferred to the rest of the network so that the network does not fail. A secure information exchange mechanism defined by WPS specification is utilized for this process. One of the methods used in configuration transfer via WPS requires entry of a password comprising 8 numbers into both of the devices. When a joint special PIN is determined and reported to the devices, which constitute the wireless network and whose configurations are subsequently intended to be matched, and the devices are made to detect the configuration change, the configurations will be matched safely and easily by means of the said PIN. The units with which this specific PIN is shared are named "Trusted Unit" and this specific PIN is named "trusted PIN".

The trusted PIN may be shared among devices automatically when configuration is first attempted. In this case, an unconfigured device receives the trusted PIN information together with the wireless settings from another device.

Thereafter, both devices share the same trusted PIN and wireless credentials. In one embodiment, a device may be preconfigured with the trusted PIN before configuration is undertaken. For example, a device may be preconfigured when such device is manufactured. In some embodiments, devices that are to operate with one another may be preconfigured with the trusted PIN when such devices are manufactured.

"Management packets" that are used in wireless communication are utilized for making the devices detect the configuration change. The configuration change detection process, flowchart of which is given in FIG. 2, is implemented as follows:

The unit (2, 3 or 4) that detects the management packet examines the WPS information in the packet (101). The unit (2, 3 or 4) checks whether there is an information field specific to the manufacturer in the packet (102). If there is no information field specific to the manufacturer in the packet (103), the device receives a new management packet and starts to examine again (101). If the packet includes information field specific to the manufacturer, it is checked whether the manufacturer code matches (104). If the manufacturer code does not match, it is concluded that the packet comes from a device of a different manufacturer (105), and the device receives a new management packet and starts to examine again (101). If the manufacturer code matches, the wireless network identification codes are controlled (106). If the wireless network identification code does not match, it is concluded that the device sending the management packet is included in a different wireless network (107), and the device receives a new management packet and starts to examine again (101). If the wireless network identification code matches, the configuration change serial number is controlled (108). If the configuration change serial number is smaller that the number in the controlling device, it is concluded that there is no configuration change (109), and the device receives a new management packet and starts to examine again (101). If the configuration change serial number is greater than the number in the controlling device, it is concluded that there is a configuration change (110), and the device receives the new configurations via the trusted PIN (111).

Since the WPS specification, which is defined for the wireless access point and the wireless device to be connected both safely and easily, does not provide a direct support for setup of mesh networks, mesh networks are setup easily and safely by adding the information required to setup mesh networks to the information sent as standard via WPS. The easiest configuration method defined by WPS consists of pressing a single button located on the devices (2, 3 or 4) that are desired to be connected to each other.

It is possible to develop a wide variety of embodiments of the inventive "Wireless Network Setup and Configuration Distribution Method (100)". The invention cannot be limited to the examples described herein and it is essentially according to the claims.

Figure 5:
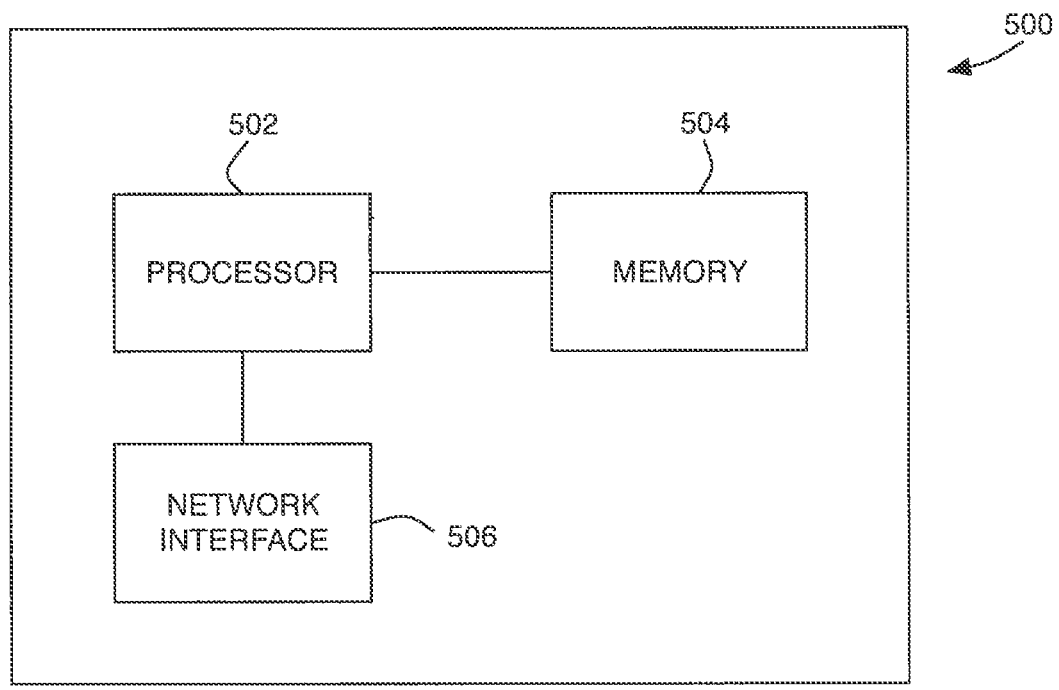
FIG. 5 is a block diagram of components that comprise an access point, router, or client device operating in a network.

Referring to FIG. 5, as is known to those skilled in the art, a device 500 operating in the wireless network described herein includes a processor 502, a memory 504, and a network interface 506. The memory 504 has stored therein computer executable instructions that, when executed, cause the processor 502 to operate the device 500 as described hereinabove. It should be apparent that the processor 502 and memory 504 may be implemented as separate components, as a single integrated circuit such as ASIC or FPGA, or a combination thereof.

A first exemplary network device in accordance with the present invention operates in a wireless network. Such first exemplary network device includes a memory that has computer executable instructions stored therein and a processor. Execution of the computer executable instructions by the processor causes the processor to examine WPS information in a management packet and determine whether there is an information field specific to a manufacturer in the management packet. If there is an information field specific to a manufacturer, the computer executable instructions cause the processor to determine whether a manufacturer code in the information field matches a manufacturer code associated with the device and, if the manufacturer codes do match, determine whether a wireless network identification code in the management packet matches a wireless network identification code associated with the device. Further, if the wireless network identification codes do match, execution of the computer executable instructions cause the processor to determine if the configuration Change serial number is greater than the configuration number in a memory of the device. If the configuration serial number in the management packet is greater than the configuration number in the memory of the device, the computer executable instructions cause the processor to determine that there is a configuration change and receive a new configuration with a trusted PIN.

In one embodiment, the first exemplary network device includes computer executable instructions, that when executed by the processor, cause the processor to renew the WPS information in the management packet if there is no information field specific to a manufacturer, if the manufacturer codes do not match, if the wireless network identification codes do not match, if the wireless network identification codes do not match, or if the configuration change serial number is smaller than the configuration number in the memory of the device.

In another embodiment, the first exemplary network device is a router that establishes a connection with another network. In some embodiments, the first exemplary network device is a router that routes the connection established thereby. In further embodiment, the first exemplary network device includes computer executable instructions, that when executed, cause the processor to determine a route of a data packet from one station to another, communicate with other devices operating in the wireless network to select a route in accordance with a routing protocol, and modify a routing table stored in the memory.

In a still further embodiment, the first exemplary network device is an access point that serves as a data transmission point in the wireless network. Such access point may be operated to expand the coverage area of the wireless network.

In some embodiments, the first exemplary network device is a client device that uses the wireless network sources. Such client device may communicate with a router operating in the wireless network. In some cases, such client device may communicate with the router via an access point operating in the network.

A second exemplary device operating in a wireless network in accordance with the present invention comprises a memory and a processor. The memory has computer executable instructions stored therein. Execution of the computer executable instructions by the processor cause the process to receive a new configuration with a trusted PIN if: a) a manufacturer code in the information field matches a manufacturer code associated with the device, b) a wireless network identification code in the management packet matches a wireless network identification code associated with the device, and c) the configuration change serial number is greater than the configuration number in a memory of the device.

In one embodiment, the second exemplary device is a router that establishes a connection with another network. In some cases, such router routes the connection established thereby. In still other cases, the execution of the computer executable instructions by the processor causes the processor to determine a route of a data packet from one station to another, communicate with other devices operating in the wireless network to select a route in accordance with a routing protocol, and modify a routing table stored in the memory.

In another embodiment, the second exemplary device is an access point that serves as a data transmission point in the wireless network. In some cases, the device is operated to expand the coverage area of the wireless network.

In a further embodiment, the second exemplary device is a client device that uses wireless network sources. In some cases, the client device communicates with a router operating in the wireless network. In some other cases, the client device communicates with the router operating in the wireless network via an access point operating in the wireless network.

According to an exemplary method of operating a device in a wireless network according to the present invention, the method includes the steps of receiving a management packet. The method includes the further step of receiving a new configuration for the device with a trusted PIN if: a) a manufacturer code in the information field matches a manufacturer code associated with the device, b) a wireless network identification code in the management packet matches a wireless network identification code associated with the device, and c) the configuration change serial number is greater than the configuration number in a memory of the device.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications that come within the scope of the present claims are reserved

What is claimed is:

1. A method comprising:
receiving, by a device operating in a network, a new configuration with a trusted Personal Identification Number (PIN) if:
a) a manufacturer code in an information field matches a manufacturer code associated with the device,
b) a wireless network identification code in a management packet matches a wireless network identification code associated with the device, and
c) a configuration change serial number is greater than a configuration number in a memory of the device.

2. The method of claim 1, wherein
the device is a router, and
the method further comprises:
establishing a connection with another network via the router.

3. The method of claim 2, further comprising:
routing the connection established by the router.

4. The method of claim 2, further comprising:
determining a route of a data packet from one station to another;
communicating with other devices operating in the wireless network to select a route in accordance with a routing protocol; and
modifying a routing table stored in a memory of the device.

5. The method of claim 1, wherein
the device is an access point serving as a data transmission point in the wireless network, and
the method further comprises:
enabling transmission of data via the access point.

6. The method of claim 5, wherein the access point expands a coverage area of the wireless network.

7. The method of claim 1, wherein the device is a client device that uses resources of the wireless network.

8. The method of claim 7, further comprising:
communicating, using the client device, with a router operating in the wireless network.

9. The method of claim 7, further comprising:
communicating, by the client device, with a router operating in the wireless network via an access point operating in the wireless network.

10. A method comprising:
examining, by a device operating in a wireless network, a plurality of parameters included in Wi-Fi Protected Setup (WPS) information in a management packet, the plurality of parameters including information related to a specific manufacturer, a wireless network identification code and a configuration change serial number, and
determining, by the device, whether there is a configuration change in the wireless network based on the examined plurality of parameters; and
receiving, by the device, a new configuration with a trusted Personal Identification Number (PIN) if the processor determines that there is the configuration change.

11. The method of claim 10, further comprising:
determining whether the information field specific to a manufacturer is included in the management packet;
if there is the information field specific to a manufacturer, determining whether a manufacturer code in the information field matches a manufacturer code associated with the device;
if the manufacturer codes match, determining whether the wireless network identification code in the management packet matches a wireless network identification code associated with the device;
if the wireless network identification codes match, determining if the configuration change serial number is greater than a configuration number in a memory of the device, wherein
if the configuration change serial number in the management packet is greater than the configuration number in the memory of the device, determining that there is a configuration change in the wireless network.

12. The method of claim 11, further comprising:
renewing the WPS information in the management packet if there is no information field specific to a manufacturer, if the manufacturer codes do not match, if the wireless network identification codes do not match, or if the configuration change serial number is smaller than the configuration number in the memory of the device.

13. The method of claim 10, wherein
the device is a router, and
the method further comprises:
establishing a connection to another network via the router.

14. The method of claim 13, further comprising:
routing the connection established by the router.

15. The method of claim 13, further comprising:
determining a route of a data packet from one station to another, communicating with other devices operating in the wireless network to select a route in accordance with a routing protocol, and modifying a routing table stored in a memory of the device.

16. The method of claim 10, wherein the device is an access point serving as a data transmission point in the wireless network, and the method further comprises:

enabling transmission of data via the access point.

17. The method of claim 16, wherein the access point expands a coverage area of the wireless network.

18. The method of claim 10, wherein the device is a client device that uses resources of the wireless network, and communicates with a router operating in the wireless network.

19. The method of claim 18, further comprising:

communicating, by the client device, with the router operating in the wireless network via an access point operating in the wireless network.

* * * * *